(12) United States Patent
Yaniv et al.

(10) Patent No.: US 6,739,932 B2
(45) Date of Patent: May 25, 2004

(54) FIELD EMISSION DISPLAY USING CARBON NANOTUBES AND METHODS OF MAKING THE SAME

(75) Inventors: Zvi Yaniv, Austin, TX (US); Richard Fink, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 10/164,530

(22) Filed: Jun. 6, 2002

(65) Prior Publication Data

US 2002/0185949 A1 Dec. 12, 2002

Related U.S. Application Data

(60) Provisional application No. 60/296,659, filed on Jun. 7, 2001.

(51) Int. Cl.[7] .................................................. H01J 9/02
(52) U.S. Cl. ...................................................... 445/24
(58) Field of Search .......................................... 445/24

(56) References Cited

U.S. PATENT DOCUMENTS

| | | | |
|---|---|---|---|
| 3,866,077 A | | 2/1975 | Baker et al. |
| 4,272,699 A | | 6/1981 | Faubel et al. |
| 4,728,851 A | | 3/1988 | Lambe |
| 5,704,820 A | * | 1/1998 | Chandross et al. ............ 445/24 |
| 5,773,921 A | | 6/1998 | Keesmann et al. |
| 5,836,798 A | * | 11/1998 | Dannoux et al. ............ 445/24 |
| 6,097,138 A | | 8/2000 | Nakamoto |
| 6,239,547 B1 | | 5/2001 | Uemura et al. |
| 6,265,466 B1 | | 7/2001 | Glatkowski et al. |
| 6,346,775 B1 | * | 2/2002 | Lee et al. ................. 315/169.3 |
| 6,359,383 B1 | | 3/2002 | Chuang et al. |
| 6,361,390 B1 | * | 3/2002 | Sreeram et al. ............... 445/24 |
| 6,380,671 B1 | | 4/2002 | Lee |
| 6,538,801 B2 | * | 3/2003 | Jacobson et al. ............ 359/296 |
| 6,545,422 B1 | * | 4/2003 | George et al. ............ 315/169.3 |
| 2002/0006489 A1 | | 1/2002 | Goth et al. |

FOREIGN PATENT DOCUMENTS

| | | |
|---|---|---|
| EP | 0 905 737 A1 | 3/1999 |
| EP | 0 913 508 A2 | 5/1999 |
| EP | 0 951 047 A2 | 10/1999 |
| EP | 1 047 097 A1 | 10/2000 |
| EP | 1 061 544 A1 | 12/2000 |
| EP | 1 061 555 A1 | 12/2000 |
| EP | 1 073 090 A2 | 1/2001 |
| EP | 1 102 298 A1 | 5/2001 |
| EP | 1 102 299 A1 | 5/2001 |
| JP | 58-216327 | 2/1994 |
| JP | 10-050240 | 2/1998 |
| JP | 9-221309 | 6/1998 |
| JP | 10-199398 | 7/1998 |
| JP | 11-111161 | 4/1999 |
| JP | 11-135042 | 5/1999 |
| JP | 11-260244 | 9/1999 |
| JP | 11-260249 | 9/1999 |
| JP | 11-297245 | 10/1999 |
| JP | 11-329311 | 11/1999 |
| JP | 11-329312 | 11/1999 |
| WO | WO 98/21736 | 5/1998 |

\* cited by examiner

*Primary Examiner*—Kenneth J. Ramsey
(74) *Attorney, Agent, or Firm*—Kelly K. Kordzik; Winstead Sechrest & Minick P.C.

(57) ABSTRACT

Embossed microstructures within a substrate are used to create narrow and deep holes within that substrate. A carbon nanotube solution or mixture is then deposited over this substrate with the embossed holes. Shaking or vibrating the substrate will then cause the carbon nanotubes to fall into each of the holes in such a way that all of the nanotubes within a hole will be substantially parallel to the long axis of the hole. This structure can then be combined with a gate electrode and an anode to create a field emission display device.

9 Claims, 4 Drawing Sheets

FIELD EMISSION DISPLAY USING CARBON NANOTUBES AND METHODS OF MAKING THE SAME

This application claims the benefit of Provisional application No. 60/296,659 filed Jun. 7, 2001.

TECHNICAL FIELD

The present invention relates in general to field emission display devices, and in particular, to the use of carbon nanotubes as field emitters in display applications.

BACKGROUND INFORMATION

Carbon nanotubes can be manufactured in volume having different dimensions (length and diameter), including single shell (single wall) or multiple shells (multiple walls). In order to make a display utilizing carbon nanotubes, one needs to possess a low cost process inducible to high volume manufacturing. To date, a typical method mixes carbon nanotubes with an adhesive and then screen prints the mixture. This method has a lot of problems with the directionality of the nanotubes, their density in the adhesive material, and the resultant resolution of the display. Furthermore, in order to make a display, a triode structure must be built that is not obvious to be realized using such a screen printing method.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
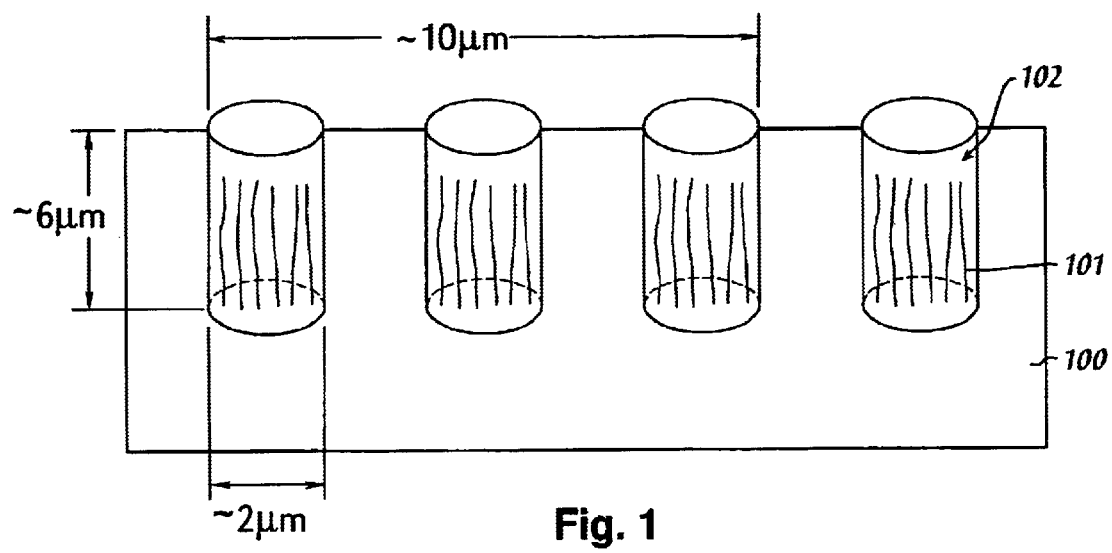
FIG. 1 illustrates a substrate with embossed holes and carbon nanotubes deposited therein.

In the following description, numerous specific details are set forth such as specific substrate materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 4:
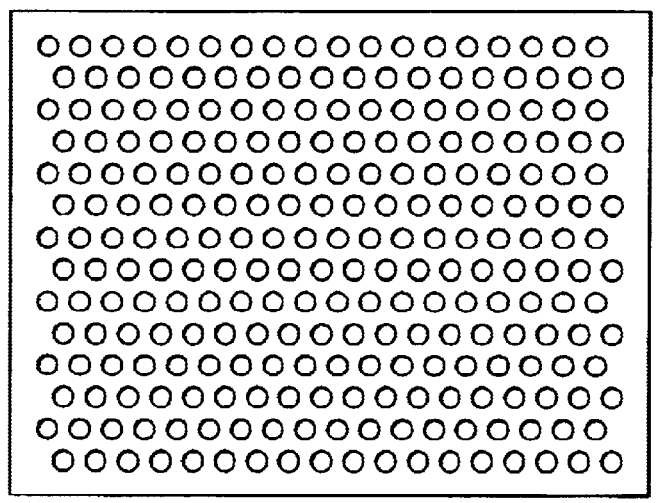
FIG. 4 illustrates a top view of holes embossed within a substrate.

The present invention utilizes embossed microstructures within a substrate, such as illustrated in FIG. 4. FIG. 4 shows such embossed microstructure holes within a material. Embossing may utilize a metal die and counter along with heat and pressure to reshape the surface of a material (paper, plastic, metal, wood, etc.). The result is a three-dimensional design which creates a sense of depth and contrast. This is sometimes referred to as "stamping," but a roller can also emboss an image in a surface. Embossing raises an image or design out of the surface. Debossing (lowering) an image in the surface is another method used to achieve attractive visual effects. The embossing can have different shapes and sizes, but for this disclosure, it will be assumed that such holes are round. Using embossing techniques, one can obtain a density of round openings of four or five holes in each ten micrometers, and the depth can be from very shallow to as deep as 20 to 30 micrometers. By properly selecting the length of the carbon nanotubes in coordination with the diameter of the opening and the depth, one can use a number of techniques that exploit the long and narrow shapes of the carbon nanotubes to be inserted into the embossed holes in such a way that all nanotubes in a hole will be more or less parallel to the long axis of the hole.

FIG. 1 illustrates the result of such a process. A substrate 100, which could be plastic, metal, semiconductor, glass, or any other type of solid material, has holes 102 embossed therein, and carbon nanotubes 101 have been deposited within each of the holes 102. A number of techniques can be utilized to direct the carbon nanotubes 101 into the embossed holes 102. For example: shaking, vibrations, carbon nanotubes in a solution, spraying, electrophoresis, magnetic fields, electric fields, etc. For example, a film of carbon nanotubes can be deposited over the embossed holes 102. Then, via shaking or vibration of the substrate 100, the long carbon nanotubes 101 will fall into the holes 102 lengthwise.

Figure 2:
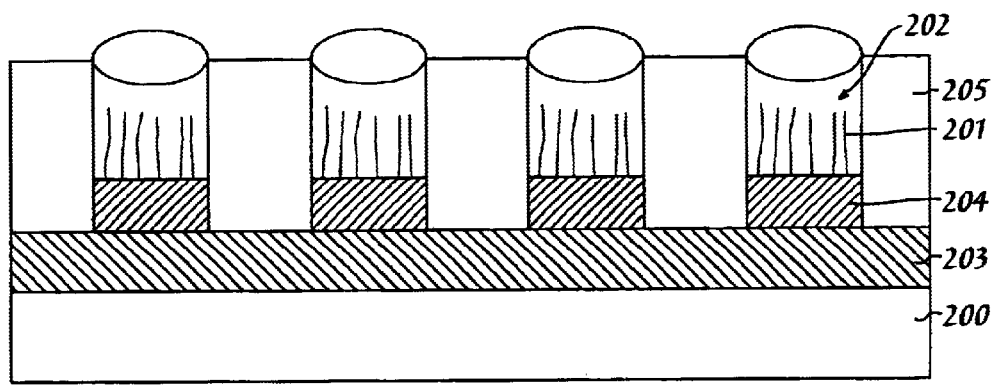
FIG. 2 illustrates a substrate with embossed holes and carbon nanotubes deposited therein, wherein a metal layer has been added within the substrate.

Referring to FIG. 2, the carbon nanotubes 201 can thereafter be fixed in the holes 202 with a solution 204 that partially fills each hole 202. The carbon nanotubes within each of the holes can then be cross-linked, for example by utilizing ultra violet energy, heat, or other means.

FIG. 2 also illustrates how to make a field emission cathode using such a technique. On top of a substrate 200, a metal layer 203 is deposited. Then a dielectric material 205 is deposited on the metal layer 203, and holes 202 are embossed within the dielectric substrate 205. The carbon nanotubes 201 are deposited within each of the holes 202 so that they come in physical contact with the metal layer 203. A material 204 can be used to fix the carbon nanotubes 201 within each of the holes 202.

Figure 3:
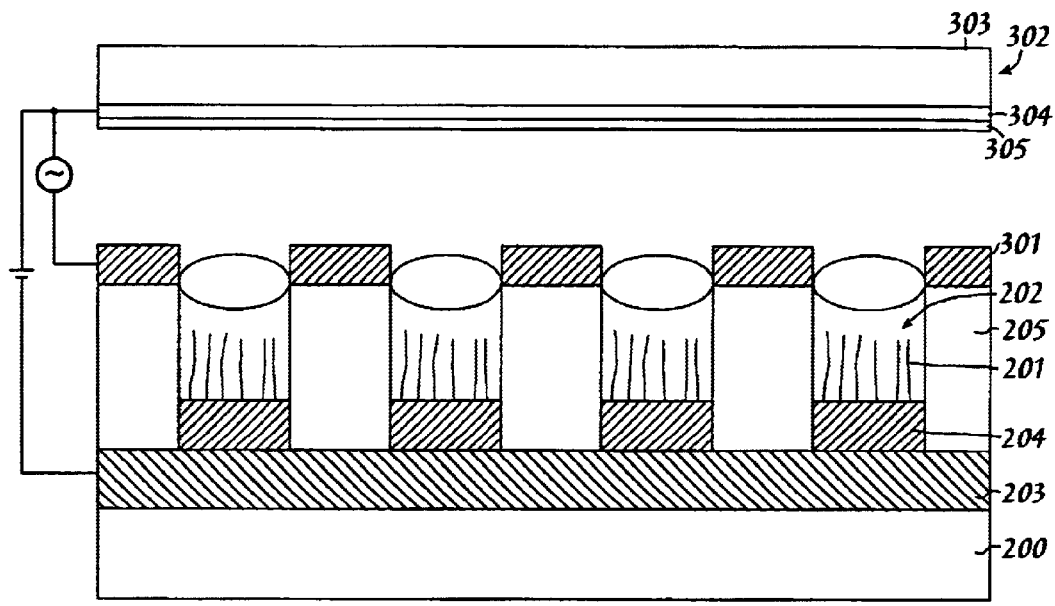
FIG. 3 illustrates a display device configured in accordance with the present invention.

Referring to FIG. 3, a conductive gate layer 301 can then be deposited on the structure shown in FIG. 2, and an anode 302 comprising a substrate 303, an indium tin oxide (ITO) layer 304 and a phosphor 305, can be positioned over the cathode. An electric field can be created between the cathode and the anode by connecting a voltage potential between the ITO layer 304 and the conductive layer 203. Emission from carbon nanotubes 201 within selected holes 202 can then be accomplished by varying a threshold voltage between the ITO layer 304 and the gate electrode 301. Matrix addressable structure, commonly known in the field emission art, such as perpendicular addressable anode and cathode (or grid) electrodes, can be utilized to cause electron emission from carbon nanotubes within very specific areas, resulting in the creation of addressable pixels.

It should be noted that all of the processes described herein can be performed at room temperature, which is advantageous over many techniques within the prior art for making field emission display devices.

Figure 5:
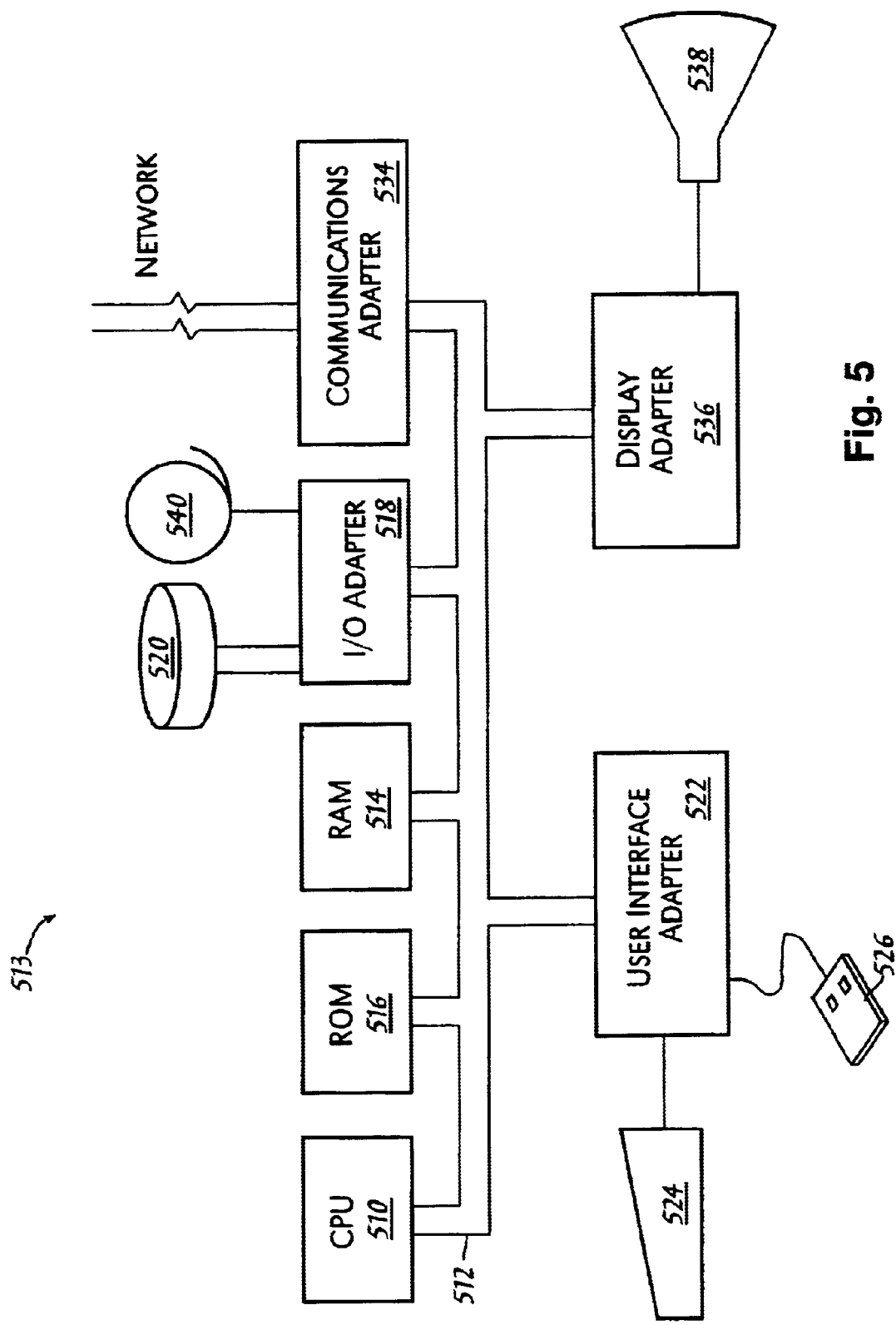
FIG. 5 illustrates a data processing system configured in accordance with the present invention.

A representative hardware environment for practicing the present invention is depicted in FIG. 5, which illustrates an exemplary hardware configuration of data processing system 513 in accordance with the subject invention having central processing unit (CPU) 510, such as a conventional microprocessor, and a number of other units interconnected via system bus 512. Data processing system 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting data processing system 513 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit. Display device 538 may be a field emission display according to the present invention.

Figure 6:
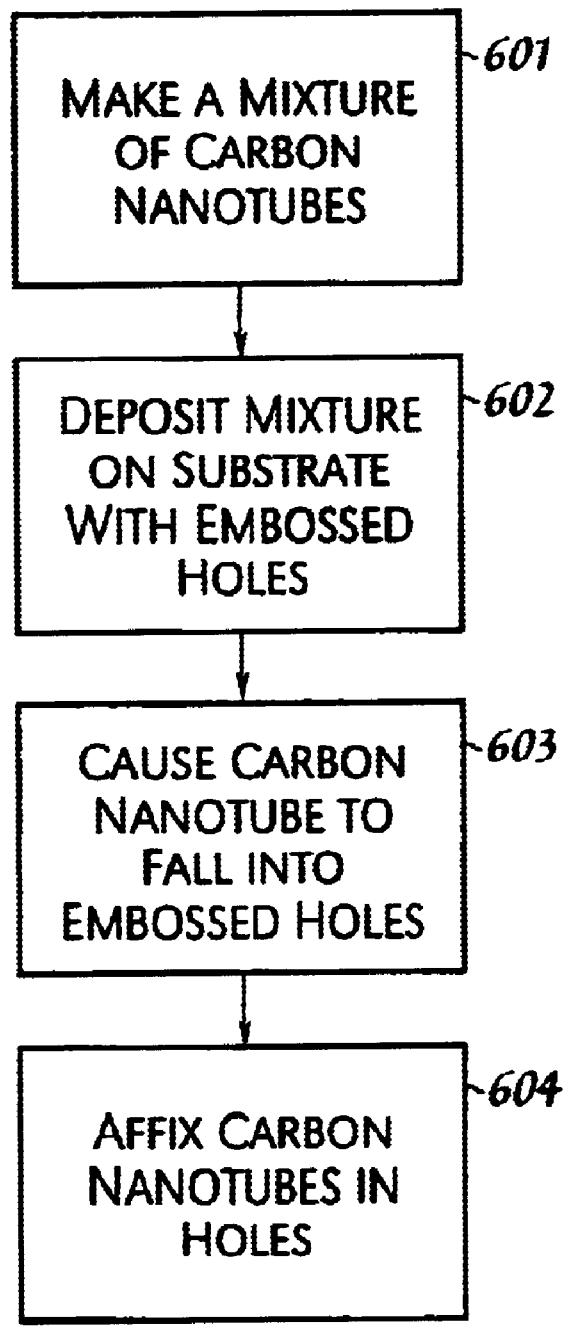
FIG. 6 illustrates a flow diagram of a method for making a display device in accordance with an embodiment of the present invention.

Referring to FIG. 6, there is illustrated a process for making a cathode structure such as the one illustrated in FIGS. 2 and 3. In step 601, a mixture of carbon nanotubes is made, such as a solution or film of carbon nanotubes that can then be deposited over the embossed holes in step 602. In step 603, the carbon nanotubes are then caused to fall into the embossed holes, such as by shaking or vibrating the substrate with the embossed holes. And then in step 604, the carbon nanotubes are affixed within each of their respective holes.

Although the present invention and its advantages have been described in detail, it should be understood that various changes, substitutions and alterations can be made herein without departing from the spirit and scope of the invention as defined by the appended claims.

What is claimed is:

1. A method for making a field emission device, comprising the steps of:

provided: embossing holes into a substrate; and disposing carbon nanotubes into the embossed holes.

2. The method as recited in claim 1, wherein the carbon nanotubes are disposed into the embossed holes so that a substantial number of the carbon nanotubes are positioned with their axes substantially parallel with long axes of the embossed holes.

3. The method as recited in claim 1, further comprising the step of coupling a power source to the field emission device in order to create an electric field to extract electrons from the carbon nanotubes.

4. A method for making a field emission device, comprising the steps of:

providing a substrate;

embossing holes into the substrate; and depositing carbon nanotubes into the embossed holes so that substantially all of the carbon nanotubes are positioned with their axes substantially parallel with long axes of the embossed holes.

5. The method as recited in claim 4, wherein the depositing step further comprises the steps of:

depositing on the substrate a solution containing the carbon nanotubes; and causing the carbon nanotubes to fall into the embossed holes.

6. The method as recited in claim 5, further comprising the step of:

positioning one or more conductive layers at the bottoms of the holes so that the carbon nanotubes electrically contact the one or more conductive layers.

7. The method as recited in claim 6, further comprising the step of:

positioning a gate electrode in proximity to the substrate.

8. The method as recited in claim 7, further comprising the step of:

positioning an anode with a phosphor a distance from the substrate.

9. The method as recited in claim 8, further comprising the step of:

connecting a voltage potential to the anode and the conductive layer.

* * * * *